United States Patent [19]

Hagemann et al.

[11] Patent Number: 4,640,067
[45] Date of Patent: Feb. 3, 1987

[54] FLOOR BOARD ASSEMBLY

[76] Inventors: Franz-Josef Hagemann, Eichendorffweg 8; Bernd Hewing, Hellstiege 10, both of 4434 Ochtrup, Fed. Rep. of Germany

[21] Appl. No.: 609,818

[22] Filed: May 14, 1984

[30] Foreign Application Priority Data

May 21, 1983 [DE] Fed. Rep. of Germany ....... 3318694

[51] Int. Cl.$^4$ .............................................. E04B 5/48
[52] U.S. Cl. ..................................................... 52/220
[58] Field of Search .............. 52/220, 685, 686, 309.9, 52/393, 394

[56] References Cited

U.S. PATENT DOCUMENTS

| | | | |
|---|---|---|---|
| 1,890,954 | 12/1932 | Snyder | 52/393 |
| 4,250,674 | 2/1981 | Feist | 52/220 |

FOREIGN PATENT DOCUMENTS

| | | | |
|---|---|---|---|
| 2644711 | 12/1977 | Fed. Rep. of Germany | 52/220 |
| 7902301 | 1/1979 | Fed. Rep. of Germany | |
| 2842213 | 4/1980 | Fed. Rep. of Germany | 52/220 |
| 3009419 | 6/1982 | Fed. Rep. of Germany | |
| 3037339 | 6/1982 | Fed. Rep. of Germany | |

Primary Examiner—William F. Pate, III
Assistant Examiner—Creighton Smith
Attorney, Agent, or Firm—Cushman, Darby and Cushman

[57] ABSTRACT

A plate on which pipes of a floor heating system can be installed includes an abrasion-proof molded cover foil of relatively tough synthetic material and an insulation sheet of synthetic foam material, arranged below the cover foil, whereby the cover foil contains holding devices, molded in one piece as clamping fingers projecting from the foil material, for securing the pipes of the heating system. The insulation sheet is provided with protruding plugs which can be inserted into the hollow clamping devices of the cover foil, whereby the cover foil and insulation sheet are held together at least temporarily. There is also provided ribs for stiffening backs of the clamping fingers.

10 Claims, 2 Drawing Figures

FLOOR BOARD ASSEMBLY

BACKGROUND OF THE INVENTION

1. Field of the Invention

The invention is directed to a plate for assembling a floor board on which pipes for a floor heating system can be installed. The plate includes an abrasion-proof molded cover foil of relatively tough synthetic material and an insulation plate of synthetic foam material, arranged below the cover foil. The cover foil contains holding devices, molded in one piece as protuberances from the foil material, for securing the heating system pipes.

The process of the present invention is directed to the production of a floor covering including plates which can be installed in a modular manner.

2. Description of the Related Art

A known plate of this general type is described in West German Laid-Open Patent Application No. 30 37 339. The plate is produced by glueing a synthetic foam plate as insulation—preferably made from a sound absorbing polystyrole foam material—behind a molded cover foil. The production of such a two-layer plate is relatively simple. However, the cover foil has to be made from a relatively tough material which alone can guarantee the clamping effect and rigidity, which requires a significant foil thickness. Because of its composition of diverse materials, the two-layer plate produced in this manner can only be cut with hard to handle tools, such as saber saws or abrasive cutters. In the protuberances, which form the clamping devices, the foil material becomes thin because of the molding. As a consequence the clamping action is reduced when the thickness of the foil gets below a certain level.

SUMMARY OF THE INVENTION

In view of these problems with known plate arrangements, it is the primary objective of the present invention to provide a plate arrangement in which the material of the cover foil can be thin, as in the known two-layer plate without significant reduction in clamping efficiency and rigidity.

The disadvantages of the prior art are overcome by providing a plate in which the insulation sheet is provided with protruding insertion parts which can be inserted, preferably in a complimentary manner, into corresponding protuberant hollow clamping devices of the cover foil, whereby the cover foil and the insulation sheet are at least temporarily connected by the insertion of the protrusions.

The plate includes two separate parts, i.e., a cover foil and an insulation sheet, which are preferably produced separately and, if desired, can be installed separately. As a rule, the parts which are assembled into a plate, cover foil and insulation sheet, are offered, sold and transported in an assembled form, as the cover foil protects the insulation sheet and secures it against breakage. Because of the thin foil material, cutting can be done with a simple knife so that handling with complicated cutting tools can be avoided. Thus, such a plate can be installed by a not very skilled tradesmen or by handymen.

It is also possible to first install the insulation layer and, if necessary, to cut it to fit. Subsequently, the cover foil can be applied and cut separately. The protrusions in the insulation sheet which are inserted into the molded protuberances of the cover foil, give additional stiffness to the hollow holding or clamping devices and provide better clamping action. As the material of the insulation layer is somewhat squeezable, it is easily inserted into the hollow protuberances. It is thus possible to fill with foam material the parts of the clamping device which are pressed towards the inside from the projection. In this context, it is suggested that the protruding surface of the clamping device which projects in the clamping direction be, as seen from above, only up to 20% of the total projection surface of the clamping device.

The rigidity of the total plate is very high, is spite of the fact that the total of material used is less than in known plates. It is also possible to increase the speed of installation and to reduce waste.

The same underlying concept is also the basis for the process of the present invention to produce a floor covering which consists of modularly installable plates. The floor covering plates include an abrasion-proof molded cover foil made from relatively tough synthetic material and an insulation layer of synthetic foam material, arranged below the cover foil.

In the process, a cover foil, containing the holding or clamping devices, or a corresponding mold is filled with a removable layer of foam material reaching into the existing hollow areas; after pouring, the synthetic foam sheet and the cover foil or mold are separated, whereby the protrusions of insertions which were formed in the hollow clamping devices, remain on the synthetic foam sheet. During installation, the synthetic foam sheets are first installed and then the cover foil, cut to fit, if necessary, whereby they are held together at least in the areas of the compatibly inserted holding devices and protrusions. After pouring the foam, i.e., before installation, there are two parts, only temporarily connected, which can be easily separated to make it possible that first one and then the other part can be separately installed.

It is possible to apply a layer of adhesive after the installation of the synthetic foam sheet and before the pressing on of the cover foil, so that the two parts adhere to each other. However, it is in most cases sufficient to press the two plate layers together and connect them just in this manner without adhesive.

It is possible that there are further protuberances, in addition to the holding or clamping devices, on the cover foil, into which protrusions reach which are shaped into the insulation sheet. Such protrusions or cams make it possible, e.g., to install planks into them so that their weight is better distributed over the whole surface.

In order to make installation easier and to avoid large waste pieces. The cover foil can be installed lengthwise, as well as turned by 90°, on the insulation sheet below. To permit this installation flexibility, the clamping devices are arranged on a square grid, whereby the sides of the square run parallel to the sides of the foil.

Various shapes are suitable for use as holding or clamping devices. Particularly suitable are those clamping devices including a group of four clamping fingers, distributed symmetrically around a center and which permit a clamping between opposing clamping fingers, and make possible clamping between the holders and a center rest. Other configurations of clamping devices are also possible, and many suitable shapes are known for such molded foils.

It is also possible to provide on the cover foil, strips along the edges which remain free of synthetic foam material when the latter is poured, and can be provided with holding devices for connection with an overlapping edge strip of an adjoining plate. The cover foils belonging to the installed plates can be connected by means of holding devices along their edges which are inserted into each other. The firmly pressed together edges are so tight that the floor covering can easily be covered with a cast plaster floor.

BRIEF DESCRIPTION OF THE DRAWINGS

The presently preferred embodiment of the invention will be described in detail with reference to the drawings, wherein.

DETAILED DESCRIPTION OF THE PREFERRED EMBODIMENT

Figure 1:
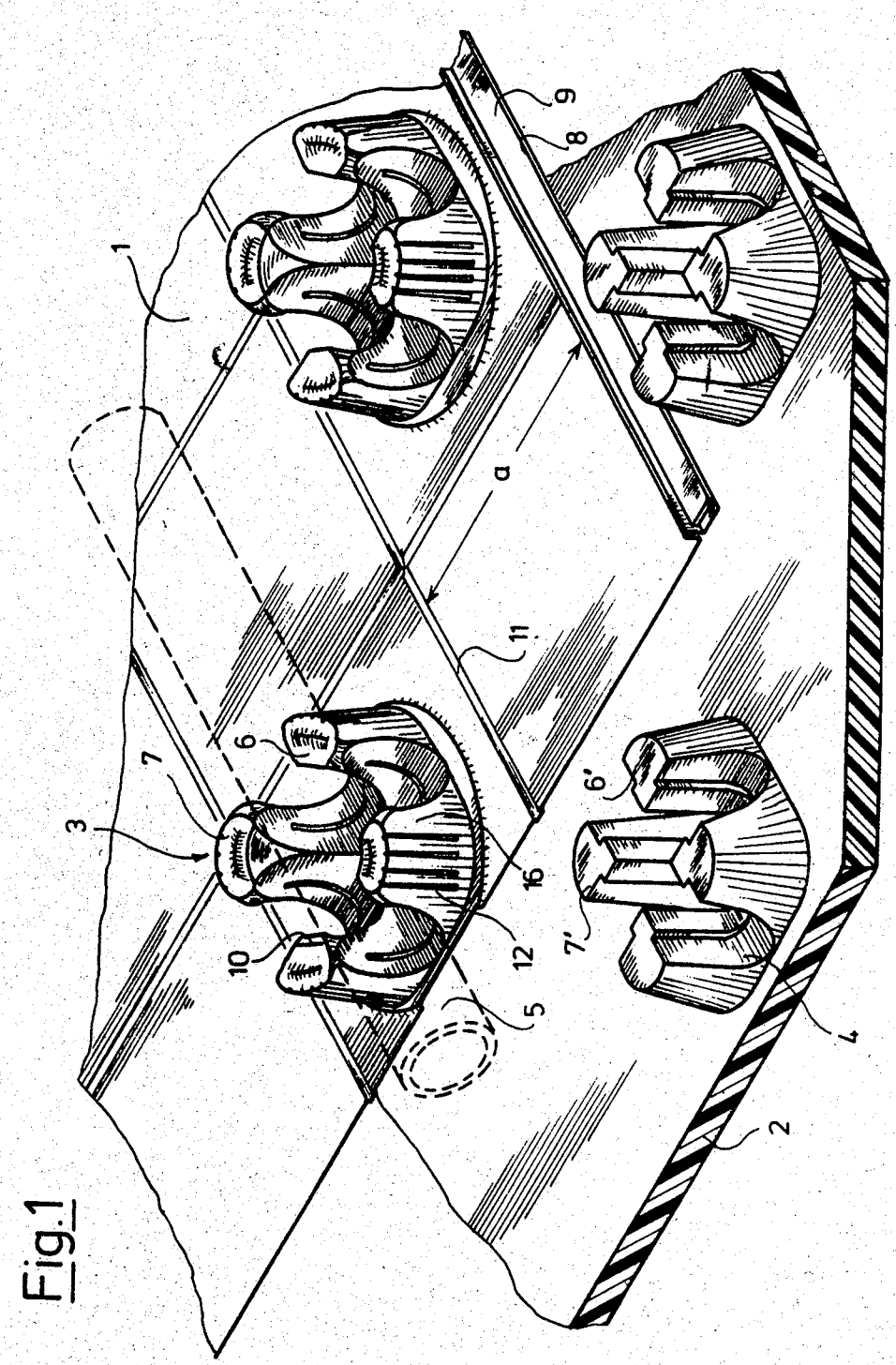
FIG. 1 is an exploded view of a two-layer plate, consisting of a cover foil and an insulation sheet.

Referring now to FIG. 1, there is shown an exploded view of the present invention installed with other plates of the same type in a modular manner into a floor covering onto which a pipe system (pipe 5 shown in a dotted line) for a floor heating system can be installed. The plate for the floor covering consists of an abrasion-proof molded cover foil 1 (thickness in the non-molded area about 0.1 to 0.5 mm) made of relatively tough synthetic material, such as polyvinylchloride, and, arranged immediately below the cover foil and covering essentially the same area, an insulation sheet 2 of synthetic foam material. Foamy polystyrole is especially suitable for the synthetic foam material of the insulation sheet 2. Formed into the cover foil 1 are holding or clamping devices 3, which are distributed on the surface of the foil in a square grid system. The clamping devices 3 are molded as protuberances, hollow on the inside, into the foil material. Furthermore, the cover foil 1 is provided with grooves 11 in an equidistant arrangement and crossing at right angles, which also form a square grid. The clamping devices 3 occupy, in the manner of a chessboard, the diagonal of the grid, as this can be seen from the indication of the drawing. It is certainly possible to deviate from this arrangement. However, it has the advantage that it permits the foil 1 to be pressed onto insulation sheet 2 in either of two directions 90° apart.

Accordingly, insulation sheet 2 is formed to have insertion parts 4 on its upper surface, which can be complimentarily inserted into the hollow areas of the holding devices 3 in the cover foil 1. The insertion parts 4 completely fill the hollow areas in the cover foil 1 and thus also provide for an increased holding power during the clamping.

To provide the clamping effect, the clamping organs can have different shapes. One shape, which has proven especially suitable is shown in FIG. 1. Here, clamping devices 3 consist in each case of a group of four clamping fingers 6, 7, 10, 16 which are distributed around a center area in a symmetrical manner and which permit between them and an opposing clamping finger, a clamping of the pipe 5. As already stated, the center point of such a clamping arrangement is arranged, in each case, on a grid at twice the distance a and which is square, whereby the sides of the square are parallel to the sides of the plates. This permits the cover foil 1 to be installed onto the insertion parts 4 of the insulation sheet 2 in a lengthwise direction as well as in a cross-direction turned by 90°.

The preferred material for the cover foil 1 is PVC, whereby the thickness of the foil only needs to be 0.2 to 0.5 mm, as the insulation sheet 2 reinforces the clamping action in the important clamping areas.

The preferred manner of production for the two-layer plate described above is that the cover foil 1, which has the hollow holding devices—preferably produced by molding—or a corresponding mold, is filled in a closed form with a synthetic foam layer which reaches into the existing hollow spaces. The synthetic foam layer is made removable from the cover foil 1 or mold by, e.g., spraying the corresponding parts with a silicon oil, whereby any adhesion during pouring is avoided.

After the pouring has been completed, the synthetic foam layer, i.e., the finished insulation sheet 2, and the cover foil 1 or mold are separated from each other, whereby humps or cams 6', 7', formed in the hollow areas of the clamping devices 3, remain on the material of the synthetic foam insulation sheet 3.

The cover foil 1 and the synthetic foam sheet 2 usually have the same number of clamping device parts (6, 7; 6', 7'); however, it is not excluded that there might be other protuberances on the cover foil 1, that corresponding cams or humps are formed on the insulation sheet 2 and that those parts can again be pushed into each other in a compatible manner.

It is preferred that—during the pouring process into the cover foil 1—a border strip 8 is left free of foam along its edge which then protrudes over the insulation sheet 2. To provide a connection between the installed plates, the edge or border strip 8 is provided—in each case along two non-parallel edges—with an adhesive material 9 which can simply be pressed on the empty overlapping edge strip 8 of the adjoining cover foil 1, which produces a connection of the parts in a simple manner, providing a very resistant and humidity-proof sealed layer when the plates are installed. Such a layer can easily be coated with a hardened cast plaster floor. Specially suitable as adhesive is a permanently flexible adhesive, such as one based on bitumen, as it also adheres well to a surface of PVC.

Figure 2:
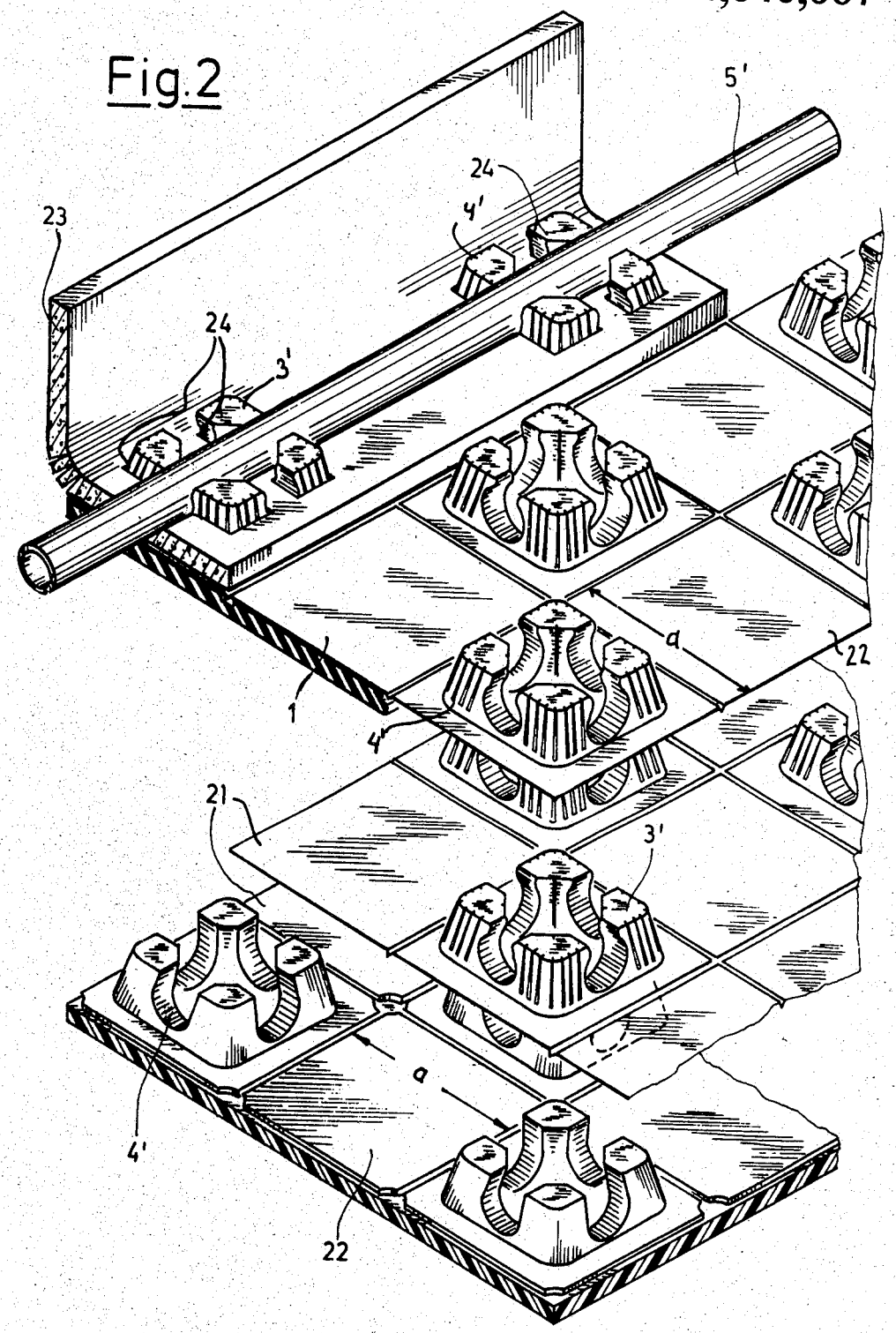
FIG. 2 shows an alternative configuration with a flexible foam material strip at an edge area.

Referring now to FIG. 2, there is shown an alternative arrangement of a two-layer plate. In this plate—also designed for assembling a floor covering—the edge areas 21, 22 are shaped as strips of the width a. The edge strips 21, 22 thus also carry—in continuation of the rest of the cover foil area—holding devices 3', 4', distributed in the grid. In a rectangular arrangement of the plates, the edge strips 21, 22 are arranged in an L-shaped manner toward two adjoining sides which are at right angles to each other. Preferably, there is no foam material below the edge strips 21, 22. When joining two plates, it is possible to let the edge strips 8 of two adjoining plates overlap each other, and to simply insert one over the other in the area of the clamping devices 3' and 4'. This arrangement provides an excellent connection and sufficient sealing to the base layer, so that no additional layer of adhesive is needed.

Furthermore, a flexible sealing strip 23 in the area of the border can be seen in FIG. 2, which contains—at twice distance "a"—perforation arrangements 24, corresponding to the protruding holding devices 3', 4'. The sealing strip 23, consisting of a flexible synthetic foam foil, about 5–10 mm thick and with a width of two times "a", can simply be inserted on the holding strips, so that no further adhesion is needed. If then a pipe 5' is inserted into the aligned clamping fingers, there results a very secure and reliable connection of the edge strip with the rest of the plate.

The use of the sealing strip 23, to be inserted along the edge, has another advantage, i.e. by avoiding the need for cutting between the cams at even "a" distance of a towards the edge, a reliable and tight edge strip can be inserted.

In addition, it is possible to use—with appropriate preliminary formation—the sealing strip also as a kind of connecting lock between two adjoining but not overlapping plates.

Another advantage of the plates to be installed according to the present invention is the fact that a very simple transport as well as simple application and installation is possible, using simple installation aids, such as contoured gripping tools. It is not necessary to use special clips or straps for the device. If necessary, it is also possible for certain applications to line the cover foil 1 with other materials or plates and, e.g., to glue them together.

The adhesion of cover foil 1 and insulation layer is sufficient by the insertion of the clamping device parts. Only in special cases is an additional glueing needed between the two parts.

The protrusion surface 10 of the clamping devices 3 in the direction of clamping is only, seen from above, in FIG. 1 up to 20% of the total projection surface of the clamping device. This restriction of the protrusion surface is mandated by the rule that a safe pouring into the protrubances of the hollow areas has to be possible without causing the synthetic material humps or cams 6' of 7' to break off in the clamping area when they are pulled out.

If desired, the synthetic foam plate forming the insulation layer 2, can be provided on one or both sides with firmly attached coating foils or reinforcements.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

We claim:

1. A plate for the assembly of a floor covering on which pipes of a floor heating system can be installed, comprising:

an abrasion-proof molded cover foil of relatively tough synthetic material, said cover foil having a plurality of equispaced one-piece molded hollow holding devices, each formed with four upwardly projecting and opposing clamping fingers, for securing the pipes therebetween, said clamping fingers having ribs formed on outer sides thereof for stiffening backs of said clamping fingers, and an insulation sheet of synthetic foam material installed directly under the cover foil, said insulation sheet having protruding insertion parts which can be inserted into the hollow holding devices of the cover foil, whereby the cover foil and the insulation sheet are at least held together provisionally by inserting the insertion parts of the insulation sheet into the hollow holding devices of the cover foil.

2. A plate according to claim 1, wherein said clamping fingers are symmetrically distributed around a center point and each permits a clamping between itself and an opposing clamping finger or between itself and a center rest.

3. A plate according to claim 1, wherein said holding devices on the cover foil are arranged in a square grid with a given side length and with sides running parallel to sides of the cover foil.

4. A plate according to claim 2, wherein said holding devices on the cover foil are arranged in a square grid with a given side length and with sides running parallel to sides of the cover foil.

5. A plate according to claim 2, wherein protruding surfaces of the holding devices, in the clamping direction, contain, as seen in a plan view, only up to 20% of a total projection surface of the holding devices.

6. A plate according to claim 1, wherein sides of the plate are provided with a flexible sealing strip.

7. A plate according to claim 6, wherein the sealing strip contains a perforation arrangement matching a configuration of the holding devices.

8. A plate according to claim 3, wherein the cover foil is formed to have an arrangement of equidistant grooves, intersecting at right angles, which form a square grid.

9. A plate according to claim 4, wherein the cover foil is formed to have an arrangement of equidistant grooves, intersecting at right angles, which form a square grid.

10. A plate according to claim 3, wherein the holding devices are distributed on the square grid in a chessboard manner.

* * * * *